L. W. APPLETON.
SPINDLE HOLDING DEVICE FOR SPOOLS.
APPLICATION FILED FEB. 27, 1915.

1,167,248.

Patented Jan. 4, 1916.

Witnesses
Fenton W. Belt
J. W. Sherwood

Inventor
Lewis W. Appleton
By Franklin H. Hough
Attorney

UNITED STATES PATENT OFFICE.

LEWIS W. APPLETON, OF PHILADELPHIA, PENNSYLVANIA, ASSIGNOR OF ONE-HALF TO ISAAC WORTMAN, OF PHILADELPHIA, PENNSYLVANIA.

SPINDLE-HOLDING DEVICE FOR SPOOLS.

1,167,248.

Specification of Letters Patent.

Patented Jan. 4, 1916.

Application filed February 27, 1915. Serial No. 11,015.

*To all whom it may concern:*

Be it known that I, LEWIS W. APPLETON, a citizen of the United States, residing at Philadelphia, in the county of Philadelphia and State of Pennsylvania, have invented certain new and useful Improvements in Spindle-Holding Devices for Spools; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for fastening spindles in spools and comprises a simple and efficient device of this nature having various details of construction, combinations and arrangements of parts which will be hereinafter fully described, shown in the accompanying drawings and then specifically defined in the appended claims.

Figure 1:
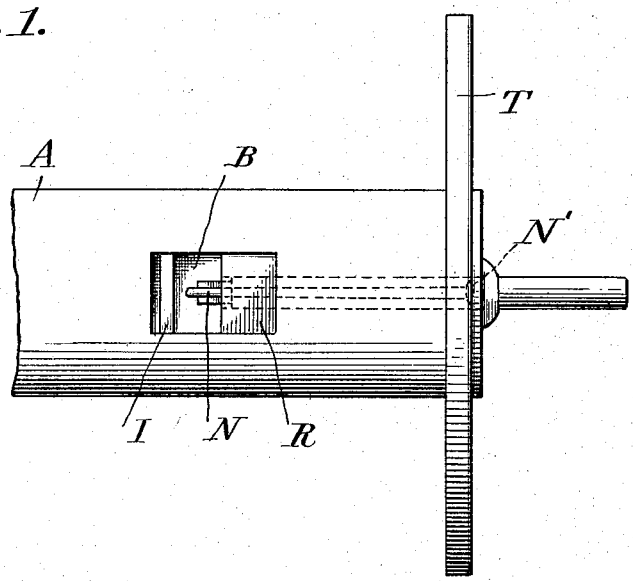
Figure 2:
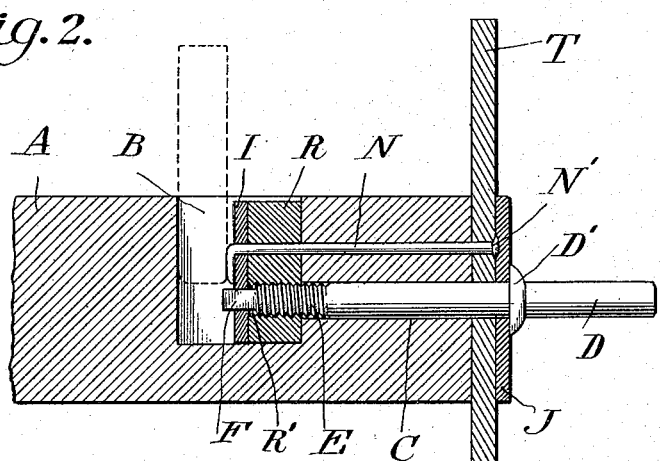
Figure 3:
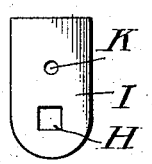
Figure 4:
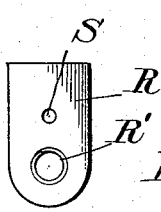

My invention is illustrated in the accompanying drawings, in which:

Figure 1 is a side elevation of one end of a spool showing the flange and spindle held thereto. Fig. 2 is a central vertical sectional view through the spool. Fig. 3 is a detail in elevation of a spindle-engaging plate. Fig. 4 is a plan view of a nut forming a part of the invention.

Reference now being had to the details of the drawings by letter, A designates a spool having a recess B formed therein of any suitable size or shape and an opening C leads through one end of the spool centrally into said recess and is provided for the reception of the spindle D having an integral flange D' thereon. Said spindle is circumferentially threaded as at E and its inner end, designated by letter F, is squared or angular in cross section and is adapted to engage a similarly outlined opening H formed in the plate I, a detail of which is shown in Fig. 3 of the drawings, and K is a perforation formed in the plate I for the reception of a locking pin or nail N. A nut R has a threaded aperture R' formed therein and also a perforation S which is adapted to register with a perforation K when the parts are adjusted in the manner shown in Fig. 2. Said nail or pin has a head N' adapted to countersink in an aperture formed in the disk T. A washer J is placed upon the spindle and has a recess to receive the head N' of the nail and against which washer the flange D' bears.

In adjusting the parts, the nut R is inserted in the recess B with the threaded aperture in alinement with the aperture C leading through one end of the spool, the nail N inserted through the disk and registering apertures in the spool and not with its end projecting beyond the face of the nut, after which the spindle is screwed through the nut, drawing the washer tight against the face of the disk and the head of the pin. The plate I is then inserted in the recess and passed over the end of the spindle, the squared portion of the latter extending through the similar-outlined aperture H and the pin extending through the aperture K, after which a tool of any suitable kind may be inserted in the recess for the purpose of clenching the end of the nail, as shown in Fig. 2 of the drawings, thus securely holding the plate I in position and which will prevent the spindle from turning, thus affording a secure and positive means for holding the parts together.

In the event of its being desider to renew any parts of the spool or spindle, the clenched end of the nail may be severed and the parts readily disconnected.

What I claim to be new is:—

1. In a device for fastening spindles upon spools comprising, in combination with a spool having a recess formed therein with an opening leading centrally through one end of the spool into said recess, a spindle having a threaded portion angular in cross section at its inner end, a nut adapted to be mounted in said recess and having a threaded opening for the reception of said screw, an apertured plate receiving the inner end of the spindle, nails passing through a portion of the spindle, nut and plate and adapted to hold the latter in place, an apertured disk through which said spindle and nail passes, and a washer mounted upon the spindle and held by the latter against the disk and outer end of the nail.

2. A device for fastening spindles upon spools comprising, in combination with a spool having a recess formed therein with an opening leading centrally through one end of the spool into said recess, a flanged spindle having a threaded portion angular in cross section at its inner end, a nut mounted in said recess and provided with a threaded aperture for the reception of the spindle and an unthreaded aperture, a plate having an angular outlined opening for the reception of the inner end of the spindle and an aperture in alinement with the unthreaded aperture in the nut, an apertured disk upon the spindle, a nail passing through registering apertures in said disk, spindle, nut and plate and against which latter the end of the nail is adapted to be clenched, a washer upon the spindle bearing against the disk and head of the nail and engaged by the flange of the spindle.

In testimony whereof I hereunto affix my signature in presence of two witnesses.

LEWIS W. APPLETON.

Witnesses:
HARRY C. FUNK,
WILLIAM COPPLEBERGER.

Copies of this patent may be obtained for five cents each, by addressing the "Commissioner of Patents, Washington, D. C."